US012678357B1

(12) United States Patent
Hibbler

(10) Patent No.: US 12,678,357 B1
(45) Date of Patent: Jul. 14, 2026

(54) SAFETY BARRIER SYSTEM FOR USE WITH FURNITURE

(71) Applicant: Cathward Hibbler, Covington, GA (US)

(72) Inventor: Cathward Hibbler, Covington, GA (US)

( * ) Notice: Subject to any disclaimer, the term of this patent is extended or adjusted under 35 U.S.C. 154(b) by 282 days.

(21) Appl. No.: 18/544,652

(22) Filed: Dec. 19, 2023

(51) Int. Cl.
*A61G 7/05* (2006.01)

(52) U.S. Cl.
CPC .................................. *A61G 7/0508* (2016.11)

(58) Field of Classification Search
CPC ........ A47D 15/00; A47D 15/008; A61G 7/00; A61G 7/0508
See application file for complete search history.

(56) References Cited

U.S. PATENT DOCUMENTS 2,544,428 A 3/1951 Judy
4,692,953 A 9/1987 Fetters
5,379,469 A 1/1995 Millis
7,103,928 B1 * 9/2006 Childs .................. A61G 7/0518 5/426
7,137,158 B2 * 11/2006 Flannery .............. A61G 7/0507 5/426
7,178,184 B2 * 2/2007 Flannery .............. A61G 7/0518 5/426
7,874,028 B2 * 1/2011 Bradford ................ A47C 31/11 5/482
7,908,689 B2 * 3/2011 Flannery .............. A61G 7/0507 5/426
9,226,585 B1 1/2016 Bright
9,387,141 B1 * 7/2016 Flannery .............. A61G 7/0507
D915,998 S 4/2021 Guo
11,140,992 B1 * 10/2021 Schmitz ................. A47C 27/15
11,406,197 B1 * 8/2022 Flannery ................. A47C 21/08
2003/0093860 A1 * 5/2003 Kramer ............... F21V 21/0824 5/425
2004/0168251 A1 * 9/2004 Waldman ............... A47C 21/08 5/426
2006/0162075 A1 7/2006 Waldman
2007/0176158 A1 8/2007 Robinson
2010/0222724 A1 * 9/2010 Huang ................. A61G 7/0573 5/607
2012/0084916 A1 * 4/2012 Flannery .................. A47D 7/02 5/426
2021/0008440 A1 1/2021 Anders
2021/0106146 A1 * 4/2021 Papera ................. A47D 15/005

FOREIGN PATENT DOCUMENTS

WO 2019180399 9/2019

* cited by examiner

*Primary Examiner* — Chi Q Nguyen

(57) ABSTRACT

A safety barrier system for use with furniture is adapted for use with a patient. The safety barrier system for use with furniture forms a protected space that encloses the patient while the patient is sleeping. The safety barrier system for use with furniture comprises a couch structure, a barrier structure, a plurality of binding straps, and a plurality of fastening devices. The couch structure forms the sleeping surface for the patient. The plurality of fastening devices secures the plurality of binding straps to the barrier structure. The plurality of binding straps binds the barrier structure to the couch structure to form the protected space.

10 Claims, 7 Drawing Sheets

SAFETY BARRIER SYSTEM FOR USE WITH FURNITURE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of accessories for chairs. (A47C7/62)

SUMMARY OF INVENTION

The safety barrier system for use with furniture is adapted for use with a patient. The safety barrier system for use with furniture forms a protected space that encloses the patient while the patient is sleeping. The safety barrier system for use with furniture comprises a couch structure, a barrier structure, a plurality of binding straps, and a plurality of fastening devices. The couch structure forms the sleeping surface for the patient. The plurality of fastening devices secures the plurality of binding straps to the barrier structure. The plurality of binding straps binds the barrier structure to the couch structure to form the protected space.

These together with additional objects, features and advantages of the safety barrier system for use with furniture will be readily apparent to those of ordinary skill in the art upon reading the following detailed description of the presently preferred, but nonetheless illustrative, embodiments when taken in conjunction with the accompanying drawings.

In this respect, before explaining the current embodiments of the safety barrier system for use with furniture in detail, it is to be understood that the safety barrier system for use with furniture is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the safety barrier system for use with furniture.

It is therefore important that the claims be regarded as including such equivalent construction insofar as they do not depart from the spirit and scope of the safety barrier system for use with furniture. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
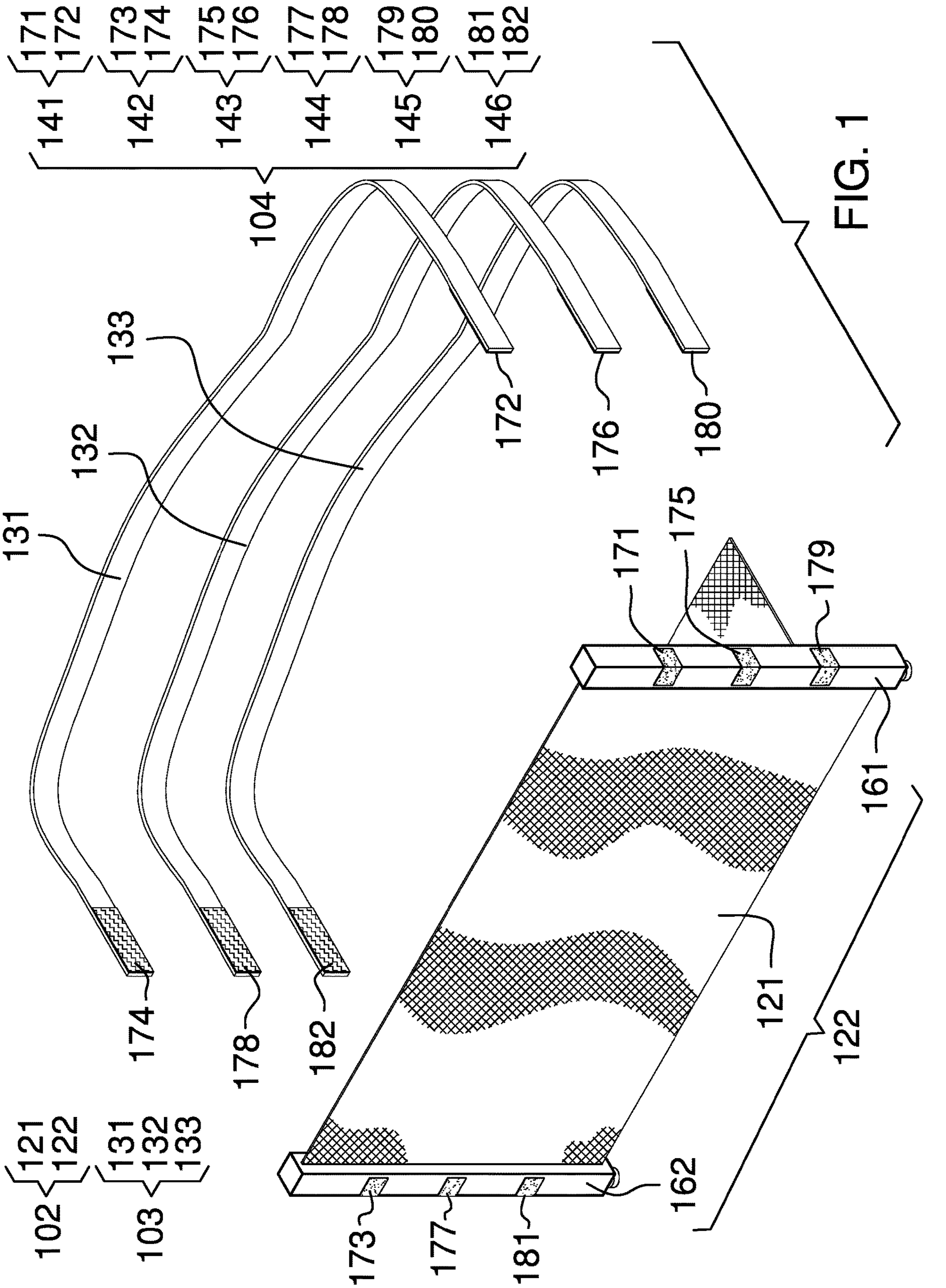
FIG. 1 is a perspective view of an embodiment of the disclosure.
Figure 2:
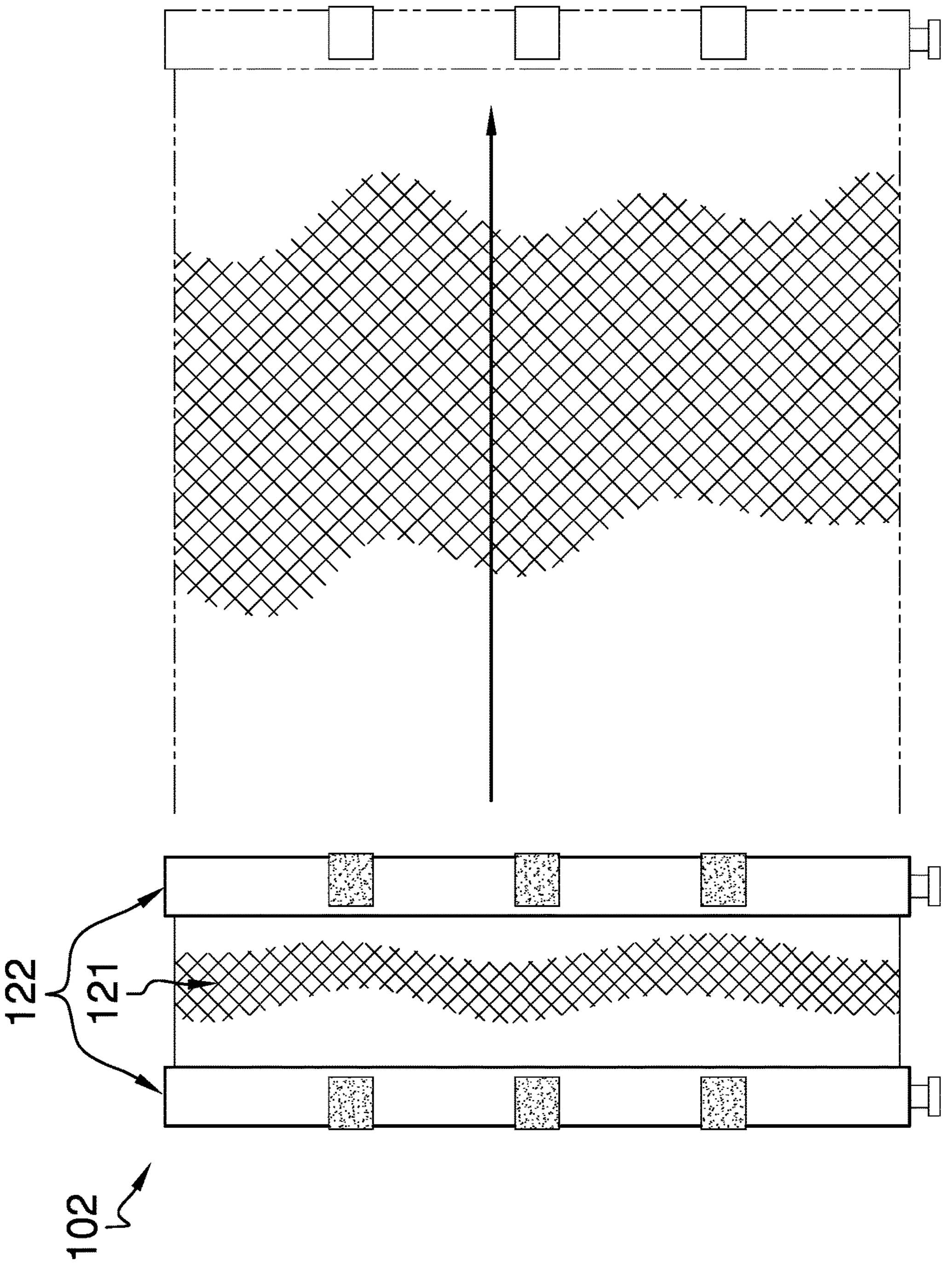
FIG. 2 is a front view of an embodiment of the disclosure.
Figure 3:
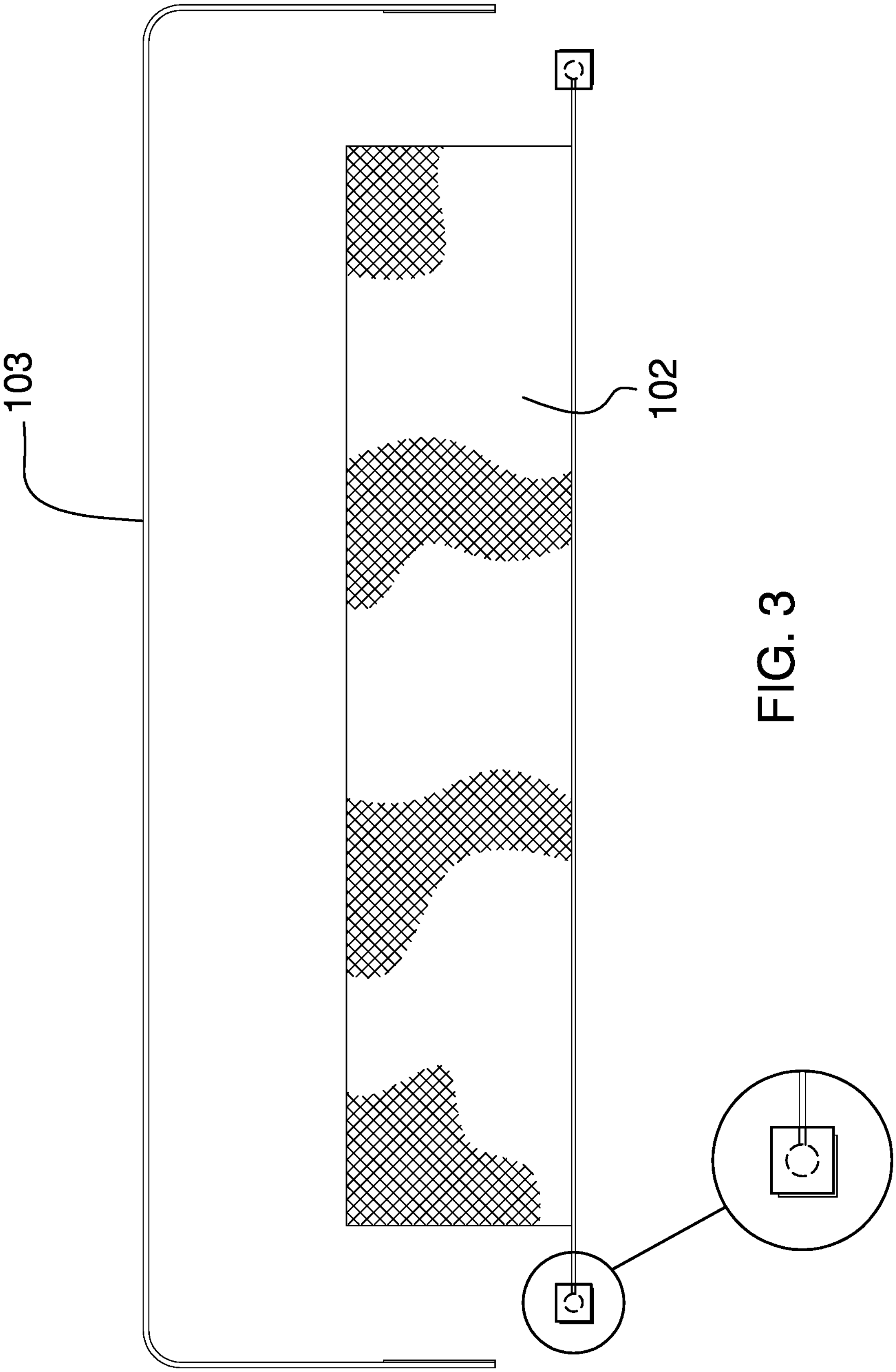
FIG. 3 is a detail view of an embodiment of the disclosure.
Figure 4:
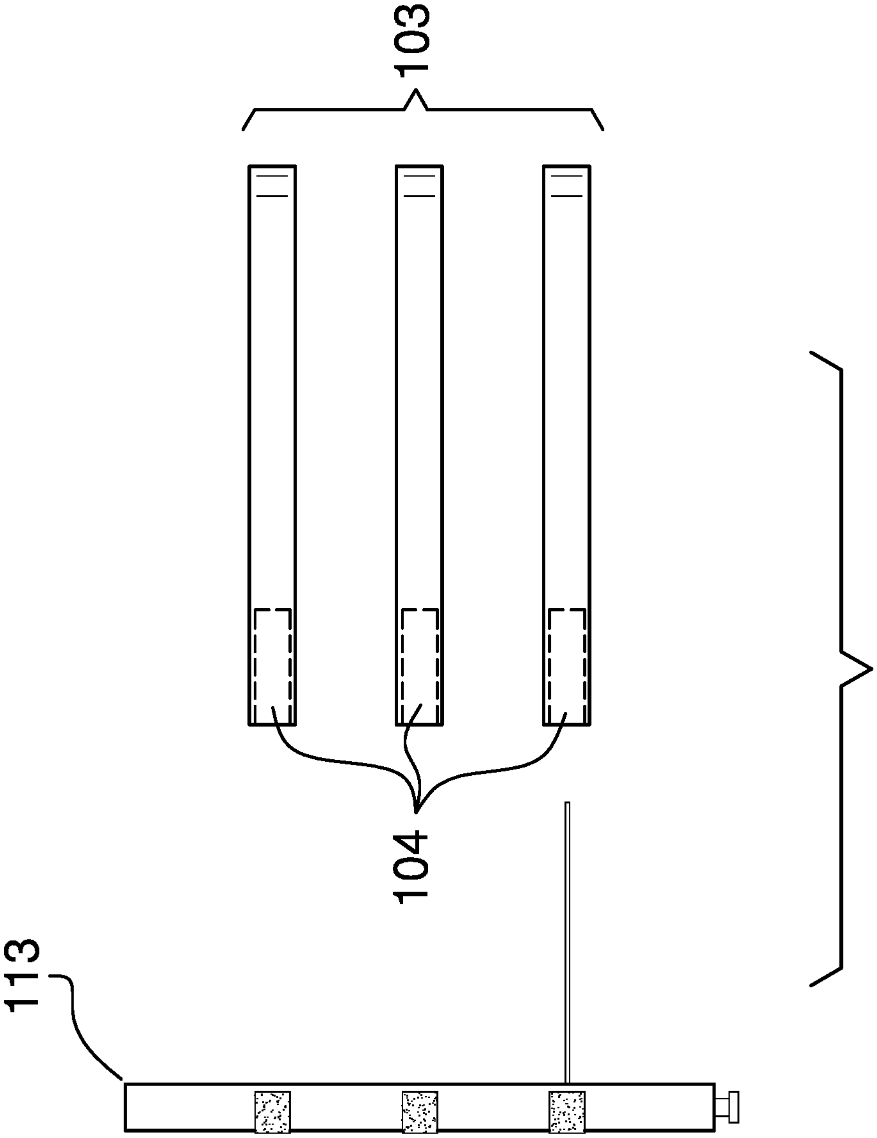
FIG. 4 is a side view of an embodiment of the disclosure.
Figure 5:
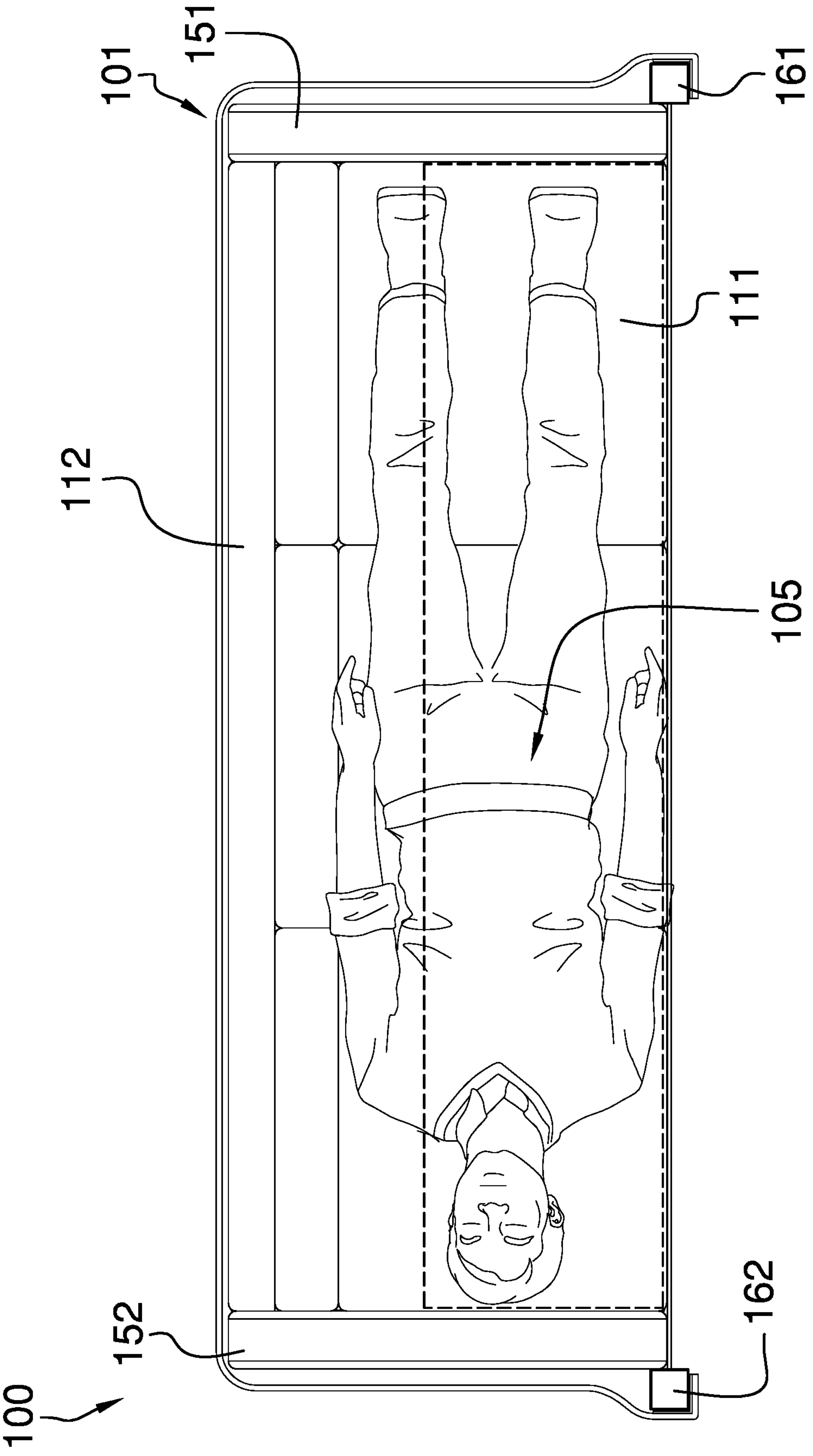
FIG. 5 is an in-use view of an embodiment of the disclosure.
Figure 6:
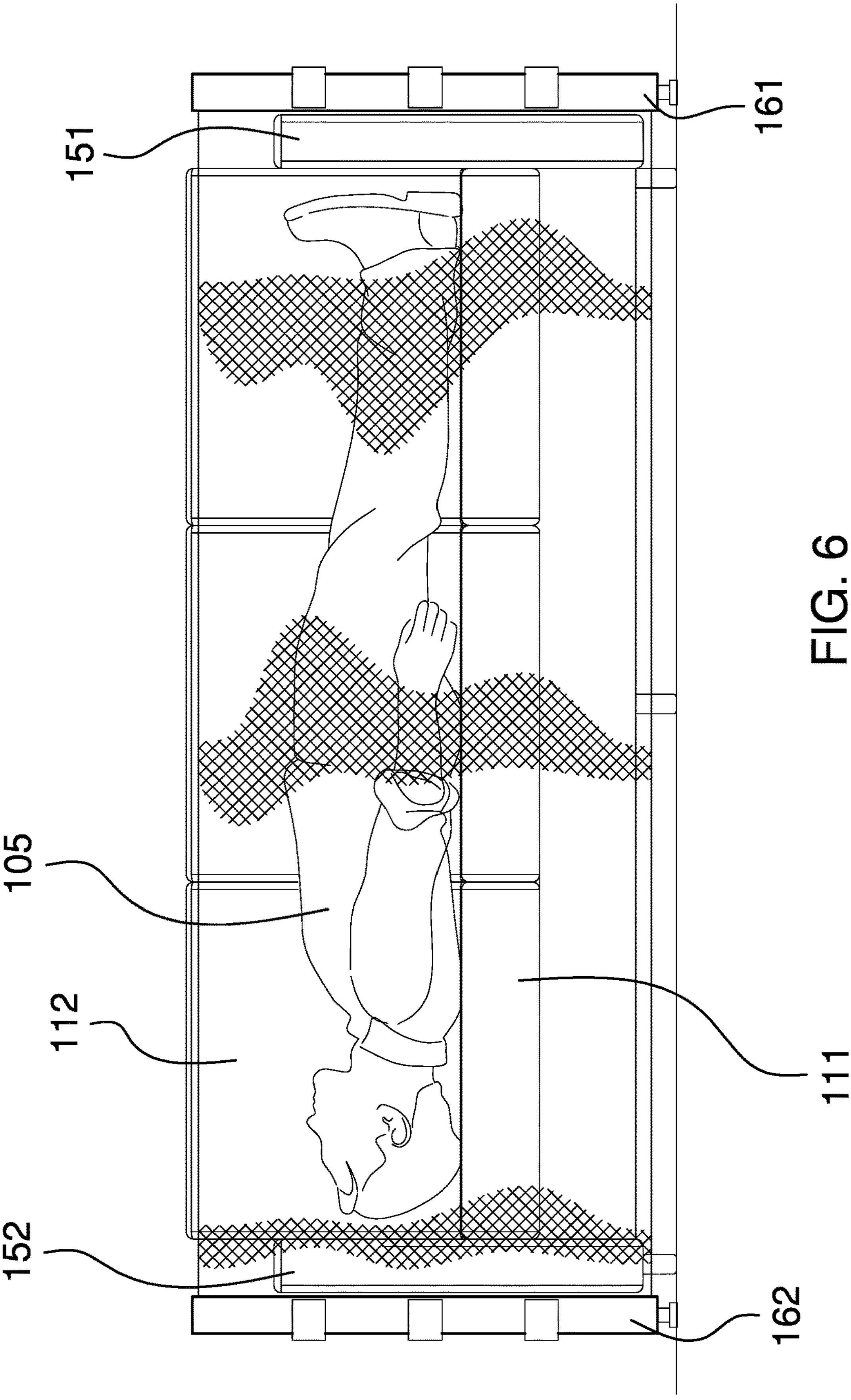
FIG. 6 is an in-use view of an embodiment of the disclosure.
Figure 7:
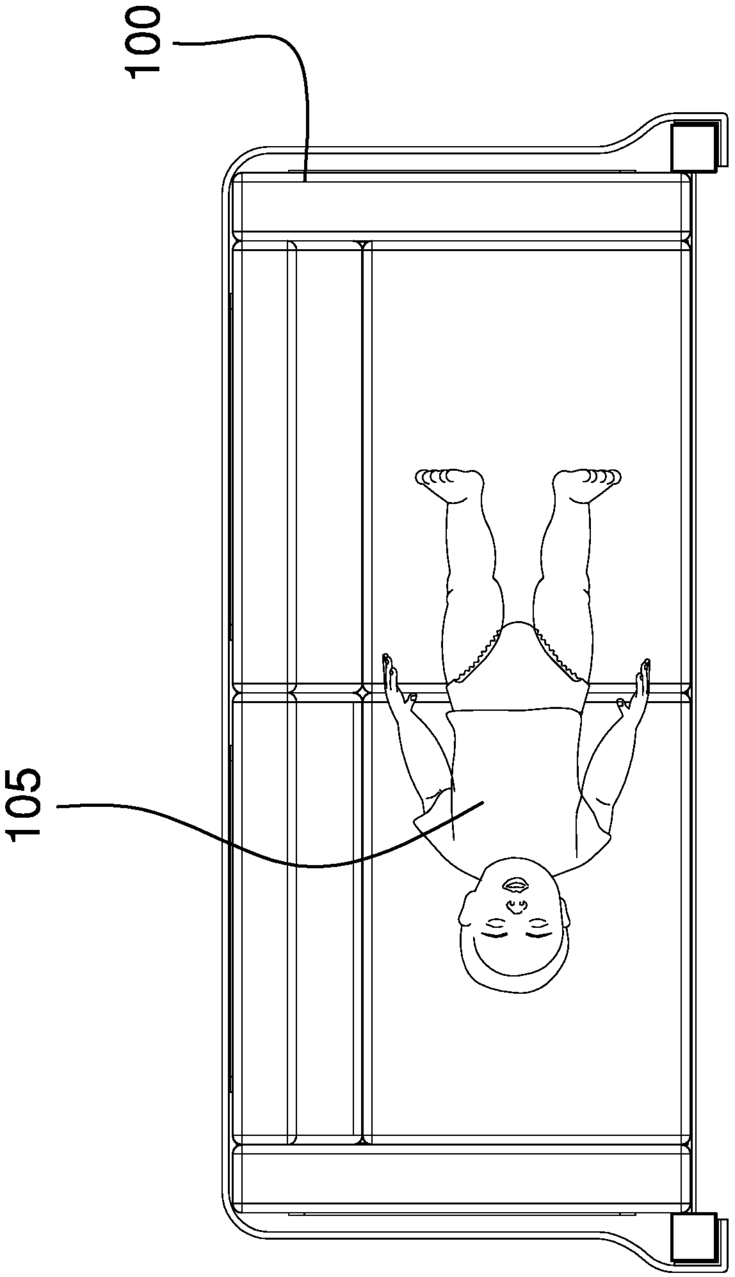
FIG. 7 is an in-use view of an embodiment of the disclosure.

Detailed reference will now be made to one or more potential embodiments of the disclosure, which are illustrated in FIGS. 1 through 7.

The safety barrier system for use with furniture 100 (hereinafter invention) is adapted for use with a patient 105. The invention 100 forms a protected space that encloses the patient 105 while the patient 105 is sleeping. The invention 100 comprises a couch structure 101, a barrier structure 102, a plurality of binding straps 103, and a plurality of fastening devices 104. The couch structure 101 forms the sleeping surface for the patient 105. The plurality of fastening devices 104 secures the plurality of binding straps 103 to the barrier structure 102. The plurality of binding straps 103 binds the barrier structure 102 to the couch structure 101 to form the protected space.

The couch structure 101 is a sofa. The sofa is defined elsewhere in this disclosure. The couch structure 101 forms a horizontal surface on which the patient 105 sleeps. The couch structure 101 comprises a bench 111, a backrest 112, and a plurality of armrests 113.

The bench 111 is the bench of the couch structure 101. The bench 111 forms the horizontal surface on which the patient 105 sleeps. The bench 111 is defined elsewhere in this disclosure.

The backrest 112 is a vertically oriented structure. The backrest 112 mounts on the posterior side of the couch structure 101. The backrest 112 forms a barrier structure that prevents the patient 105 from entering and exiting the bench 111 from the posterior side of the couch structure 101. The backrest 112 is defined elsewhere in this disclosure.

The plurality of armrests 113 are vertically oriented structures. The plurality of armrests 113 mount on the lateral sides of the couch structure 101. The plurality of armrests 113 form barrier structures that prevent the patient 105 from entering and exiting the bench 111 from the lateral sides of the couch structure 101. The armrest is defined elsewhere in this disclosure. The plurality of armrests 113 comprises a left armrest 151 and a right armrest 152.

The left armrest 151 is the armrest selected from the barrier structure 102 that encloses the left side of the couch structure 101. The left armrest 151 prevents the patient 105 from entering and exiting the bench 111 from the left side of the couch structure 101. The right armrest 152 is the armrest selected from the barrier structure 102 that encloses the right side of the couch structure 101. The right armrest 152 prevents the patient 105 from entering and exiting the bench 111 from the right side of the couch structure 101.

The barrier structure 102 is a vertically oriented structure. The barrier structure 102 encloses the anterior face of the couch structure 101. The barrier structure 102 forms the protected space that prevents the patient 105 from rolling out of the couch structure 101 while sleeping. The barrier 18 structure 102 comprises a mesh sheeting 121 and a plurality of stanchion structures 122.

The mesh sheeting 121 is a textile based sheeting structure. The mesh sheeting 121 is an openwork structure. The mesh sheeting 121 is formed as a mesh. The mesh sheeting 121 forms a vertically oriented barrier structure. The mesh sheeting 121 is positioned relative to the couch structure 101 such that the mesh sheeting 121 prevents the patient 105 from entering and exiting the bench 111 from the anterior side of the couch structure 101.

The plurality of stanchion structures 122 forms a load bearing structure. The mesh sheeting 121 attaches to each stanchion structure selected from the plurality of stanchion structures 122. The plurality of binding straps 103 bind the plurality of stanchion structures 122 to the plurality of armrests 113 of the couch structure 101 such that the mesh sheeting 121 is held in a fixed position relative to the couch structure 101. The plurality of stanchion structures 122 comprises a left stanchion structure 161 and a right stanchion structure 162.

The left stanchion structure 161 is a rigid structure. The left stanchion structure 161 is a load bearing structure. The mesh sheeting 121 permanently attaches to the left stanchion structure 161. The left stanchion structure 161 secures the mesh sheeting 121 into a fixed position along the anterior side of the couch structure 101. The left stanchion structure 161 is bound to the couch structure 101 at a position proximal to the left armrest 151.

The right stanchion structure 162 is a rigid structure. The right stanchion structure 162 is a load bearing structure. The mesh sheeting 121 permanently attaches to the right stanchion structure 162. The right stanchion structure 162 secures the mesh sheeting 121 into a fixed position along the anterior side of the couch structure 101. The right stanchion structure 162 is bound to the couch structure 101 at a position proximal to the right armrest 152.

Each binding strap selected from the plurality of binding straps 103 is a webbing. Each selected binding strap is formed with a tensile strength but not with a compressive strength. Each selected binding strap removably attaches to the left armrest 151 of the barrier structure 102. Each selected binding strap removably attaches to the right armrest 152 of the barrier structure 102. Each selected binding strap wraps around the bench 111, the backrest 112, and the plurality of armrests 113 of the couch structure 101. Each selected binding strap applies a tension to the barrier structure 102 that binds the barrier structure 102 to the anterior face of the couch structure 101. The plurality of binding straps 103 comprises a first binding strap 131, a second binding strap 132, and a third binding strap 133.

The first binding strap 131 is a textile based webbing structure. The first binding strap 131 is a flexible structure. The first binding strap 131 is a load bearing structure. The first binding strap 131 attaches to both the left armrest 151 and the right armrest 152 of the barrier structure 102. The first binding strap 131 applies a tension to the left armrest 151 and the right armrest 152 that binds the barrier structure 102 to the couch structure 101.

The second binding strap 132 is a textile based webbing structure. The second binding strap 132 is a flexible structure. The second binding strap 132 is a load bearing structure. The second binding strap 132 attaches to both the left armrest 151 and the right armrest 152 of the barrier structure 102. The second binding strap 132 applies a tension to the left armrest 151 and the right armrest 152 that binds the barrier structure 102 to the couch structure 101.

The third binding strap 133 is a textile based webbing structure. The third binding strap 133 is a flexible structure. The third binding strap 133 is a load bearing structure. The third binding strap 133 attaches to both the left armrest 151 and the right armrest 152 of the barrier structure 102. The third binding strap 133 applies a tension to the left armrest 151 and the right armrest 152 that binds the barrier structure 102 to the couch structure 101.

The plurality of fastening devices 104 form the structures that removably secure each binding strap selected from the plurality of binding straps 103 to the barrier structure 102. Each fastening device selected from the plurality of fastening devices 104 is associated with a binding strap selected from the plurality of binding straps 103. Each fastening device selected from the plurality of fastening devices 104 detachably secures its associated selected binding strap to a stanchion structure selected from the group consisting of: a) the left stanchion structure 161; and, b) the right stanchion structure 162. Each fastening device selected from the plurality of fastening devices 104 is an adjustable structure. Each selected fastening device is adjusted to control the binding tension applied by its associated binding strap selected from the plurality of binding straps 103 to the barrier structure 102 and the couch structure 101.

Each fastening device selected from the plurality of fastening devices 104 is a hook and loop fastener. The plurality of fastening devices 104 comprises a first hook and loop fastener 141, a second hook and loop fastener 142, a third hook and loop fastener 143, a fourth hook and loop fastener 144, a fifth hook and loop fastener 145, and a sixth hook and loop fastener 146.

The first hook and loop fastener 141 is the hook and loop faster that secures the first binding strap 131 to the left armrest 151. The second hook and loop fastener 142 is the hook and loop faster that secures the first binding strap 131 to the right armrest 152. The third hook and loop fastener 143 is the hook and loop faster that secures the second binding strap 132 to the left armrest 151. The fourth hook and loop fastener 144 is the hook and loop faster that secures the second binding strap 132 to the right armrest 152. The fifth hook and loop fastener 145 is the hook and loop faster that secures the third binding strap 133 to the left armrest 151. The sixth hook and loop fastener 146 is the hook and loop faster that secures the third binding strap 133 to the right armrest 152.

The first hook and loop fastener 141 further comprises a first hook/loop surface 171 and a second hook/loop surface 172. The second hook and loop fastener 142 further comprises a third hook/loop surface 173 and a fourth hook/loop surface 174.

The first hook/loop surface 171 is the hook/loop surface selected from the first hook and loop fastener 141 that attaches to the left armrest 151. The second hook/loop surface 172 is the hook/loop surface selected from the first hook and loop fastener 141 that attaches to the perimeter edge of the first binding strap 131 with the least span of length. The first hook and loop fastener 141 is formed by pressing the second hook/loop surface 172 into the first hook/loop surface 171. The tension on the first binding strap 131 adjusts by adjusting the position of the second hook/loop surface 172 relative to the first hook/loop surface 171 during the attachment process.

The third hook/loop surface 173 is the hook/loop surface selected from the second hook and loop fastener 142 that attaches to the right armrest 152. The fourth hook/loop surface 174 is the hook/loop surface selected from the second hook and loop fastener 142 that attaches to the perimeter edge of the first binding strap 131 that is distal from the second hook/loop surface 172. The second hook and loop fastener 142 is formed by pressing the fourth hook/loop surface 174 into the third hook/loop surface 173. The tension on the first binding strap 131 adjusts by adjusting the position of the fourth hook/loop surface 174 relative to the third hook/loop surface 173 during the attachment process.

The third hook and loop fastener 143 further comprises a fifth hook/loop surface 175 and a sixth hook/loop surface 176. The fourth hook and loop fastener 144 further comprises a seventh hook/loop surface 177 and an eighth hook/loop surface 178.

The fifth hook/loop surface 175 is the hook/loop surface selected from the third hook and loop fastener 143 that attaches to the left armrest 151. The sixth hook/loop surface 176 is the hook/loop surface selected from the third hook and loop fastener 143 that attaches to the perimeter edge of the second binding strap 132 with the least span of length. The third hook and loop fastener 143 is formed by pressing the sixth hook/loop surface 176 into the fifth hook/loop surface 175. The tension on the second binding strap 132 adjusts by adjusting the position of the sixth hook/loop surface 176 relative to the fifth hook/loop surface 175 during the attachment process.

The seventh hook/loop surface 177 is the hook/loop surface selected from the fourth hook and loop fastener 144 that attaches to the right armrest 152. The eighth hook/loop surface 178 is the hook/loop surface selected from the fourth hook and loop fastener 144 that attaches to the perimeter edge of the second binding strap 132 that is distal from the sixth hook/loop surface 176. The fourth hook and loop fastener 144 is formed by pressing the eighth hook/loop surface 178 into the seventh hook/loop surface 177. The tension on the second binding strap 132 adjusts by adjusting the position of the eighth hook/loop surface 178 relative to the seventh hook/loop surface 177 during the attachment process.

The fifth hook and loop fastener 145 further comprises a ninth hook/loop surface 179 and a tenth hook/loop surface 180. The sixth hook and loop fastener 146 further comprises an eleventh hook/loop surface 181 and a twelfth hook/loop surface 182.

The ninth hook/loop surface 179 is the hook/loop surface selected from the fifth hook and loop fastener 145 that attaches to the left armrest 151. The tenth hook/loop surface 180 is the hook/loop surface selected from the fifth hook and loop fastener 145 that attaches to the perimeter edge of the third binding strap 133 with the least span of length. The fifth hook and loop fastener 145 is formed by pressing the tenth hook/loop surface 180 into the ninth hook/loop surface 179. The tension on the third binding strap 133 adjusts by adjusting the position of the tenth hook/loop surface 180 relative to the ninth hook/loop surface 179 during the attachment process.

The eleventh hook/loop surface 181 is the hook/loop surface selected from the sixth hook and loop fastener 146 that attaches to the right armrest 152. The twelfth hook/loop surface 182 is the hook/loop surface selected from the sixth hook and loop fastener 146 that attaches to the perimeter edge of the third binding strap 133 that is distal from the tenth hook/loop surface 180. The sixth hook and loop fastener 146 is formed by pressing the twelfth hook/loop surface 182 into the eleventh hook/loop surface 181. The tension on the third binding strap 133 adjusts by adjusting the position of the twelfth hook/loop surface 182 relative to the eleventh hook/loop surface 181 during the attachment process.

The following definitions were used in this disclosure:

Anterior: As used in this disclosure, anterior is a term that is used to refer to the front side or direction of a structure. When comparing two objects, the anterior object is the object that is closer to the front of the structure.

Armrest: As used in this disclosure, an armrest is a structure formed along a lateral side of a chair. The armrest forms a structure on which a person can place an arm.

Backrest: As used in this disclosure, a backrest is a vertical or vertically canted supporting surface formed along the posterior side of a chair. The backrest supports the back of a person sitting in the chair.

Barrier: As used in this disclosure, a barrier is a physical obstacle that forms a boundary between a first space and a second space. The barrier prevents the passage of an object between the first space and the second space.

Bench: As used in this disclosure, a bench is a horizontal supporting surface formed by a chair.

Bind: As used in this disclosure, to bind is a verb that means to tie or secure a first object to a second object using a strap, cord or webbing. Bind can also mean to tie or secure a plurality of similar first objects together by wrapping a second object around the plurality of similar first objects.

Chair: As used in this disclosure, a chair is a structure that a person can sit on. The horizontal resting surface a person sits on is called the bench. Seat is a common synonym for a chair. A sofa refers to a chair that seats more than one person.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object.

Common fasteners include, but are not limited to, hooks, zippers, magnets, snaps, buttons, buckles, quick release buckles, or hook and loop fasteners. A fastener is often referred to as a fastening device.

Fastening Device: As used in this disclosure, a fastening device is a device that is used to join or affix a first object to a second object.

Felt: As used in this disclosure, felt is a non-woven sheeting material Force of Gravity: As used in this disclosure, the force of gravity refers to a vector that indicates the direction of the pull of gravity on an object at or near the surface of the earth.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Mesh: As used in this disclosure, the term mesh refers to an openwork fabric made from threads, yarns, cords, wires, or lines that are woven, knotted, or otherwise twisted or intertwined at regular intervals. Synonyms for mesh include net. A mesh structure formed from metal bars or wires is often referred to as a grate.

Openwork: As used in this disclosure, the term openwork is used to describe a structure, often a surface, which is formed with one or more openings that allow for visibility and fluid flow through the structure. Wrought work and meshes are forms of openwork.

Patient: As used in this disclosure, a patient is a person who is designated to receive a medical treatment, therapy or service. The term patient may be extended to an animal when used within the context of the animal receiving veterinary treatment or services.

Platform: As used in this disclosure, a platform is an elevated horizontal surface that forms a load path to support objects placed on or suspended from the elevated horizontal surface of the platform.

Posterior: As used in this disclosure, posterior is a term that is used to refer to the side of an object that is distal or in the opposite direction of the anterior side. When comparing two items, the posterior item is the item that is distal from the anterior of the object.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Seat: As used in this disclosure, a seat is a structure that a person can sit on. Chair is a common synonym for a seat.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Stanchion: As used in this disclosure, a stanchion refers to a vertically oriented prism-shaped pole, post, or support.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape. Strips often have a disk shape.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Textile: As used in this disclosure, a textile is a material that is woven, knitted, braided or felted. Synonyms in common usage for this definition include fabric and cloth. The two surfaces of the textile with the greatest surface area are called the faces of the textile.

Therapeutic: As used in this disclosure, therapeutic is an adjective that refers to a medical, ameliorative, or hygienic substance, process, procedure, or device.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The shape of a webbing is approximated by a rectangular disk shape. The two surfaces of a webbing with the greatest surface area are called the faces of the webbing.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A safety barrier system for use with furniture comprising a couch structure, a barrier structure, a plurality of binding straps, and a plurality of fastening devices;

wherein the couch structure forms a sleeping surface for a patient;

wherein the plurality of fastening devices secure the plurality of binding straps to the barrier structure;

wherein the plurality of binding straps bind the barrier structure to the couch structure;

wherein the couch structure comprises a bench, a backrest, and a plurality of armrests;

wherein the barrier structure is a vertically oriented structure, which forms a protected space that is adapted to prevent the patient from rolling out of the couch structure while sleeping;

wherein each binding strap selected from the plurality of binding straps is a webbing;

wherein each selected binding strap is formed with a tensile strength;

wherein each selected binding strap removably attaches to the left armrest of the barrier structure;

wherein each selected binding strap removably attaches to the right armrest of the barrier structure;

wherein each selected binding strap wraps around the bench, the backrest, and the plurality of armrests of the couch structure;

wherein each selected binding strap applies a tension to the barrier structure that binds the barrier structure to the anterior face of the couch structure.

2. The safety barrier system for use with furniture according to claim 1 wherein the safety barrier system for use with furniture is adapted for use with the patient;

wherein the safety barrier system forms the protected space that encloses the patient while the patient is sleeping;

wherein the plurality of binding straps binds the barrier structure to the couch structure to form the protected space.

3. The safety barrier system for use with furniture according to claim 2 wherein the couch structure is a sofa;

wherein the couch structure is adapted to form a horizontal surface where the patient sleeps;

wherein the backrest is a vertically oriented structure;

wherein the backrest mounts on a posterior side of the couch structure;

wherein the backrest forms a barrier structure that prevents the patient from entering and exiting the bench from the posterior side of the couch structure;

wherein the plurality of armrests are vertically oriented structures;

wherein the plurality of armrests mount on the lateral sides of the couch structure;

wherein the plurality of armrests form barrier structures that prevent the patient from entering and exiting the bench from the lateral sides of the couch structure;

wherein the plurality of armrests comprises a left armrest and a right armrest;

wherein the left armrest is the armrest selected from the barrier structure that encloses the left side of the couch structure;

wherein the left armrest prevents the patient from entering and exiting the bench from the left side of the couch structure;

wherein the right armrest is the armrest selected from the barrier structure that encloses the right side of the couch structure;

wherein the right armrest prevents the patient from entering and exiting the bench from the right side of the couch structure.

4. The safety barrier system for use with furniture according to claim 3 wherein the barrier structure encloses an anterior face of the couch structure.

5. The safety barrier system for use with furniture according to claim 4 wherein the plurality of fastening devices form the structures that removably secure each binding strap selected from the plurality of binding straps to the barrier structure;

wherein each fastening device selected from the plurality of fastening devices is associated with a binding strap selected from the plurality of binding straps;

wherein each fastening device selected from the plurality of fastening devices detachably secures the associated selected binding strap to a stanchion structure selected from the group consisting of: a) a left stanchion structure; and, b) a right stanchion structure;

wherein each fastening device selected from the plurality of fastening devices is an adjustable structure;

wherein each selected fastening device is adjusted to control the binding tension applied by the associated binding strap selected from the plurality of binding straps to the barrier structure and the couch structure;

wherein each fastening device selected from the plurality of fastening devices is a hook and loop fastener.

6. The safety barrier system for use with furniture according to claim 5 wherein the barrier structure comprises a mesh sheeting and a plurality of stanchion structures;

wherein the mesh sheeting attaches to each stanchion structure selected from the plurality of stanchion structures.

7. The safety barrier system for use with furniture according to claim 6 wherein the mesh sheeting is a textile based sheeting structure;

wherein the mesh sheeting is an openwork structure;

wherein the mesh sheeting is formed as a mesh;

wherein the mesh sheeting forms a vertically oriented barrier structure;

wherein the mesh sheeting is positioned relative to the couch structure such that the mesh sheeting prevents the patient from entering and exiting the bench from the anterior side of the couch structure.

8. The safety barrier system for use with furniture according to claim 7 wherein the plurality of stanchion structures forms a load bearing structure;

wherein the plurality of binding straps bind the plurality of stanchion structures to the plurality of armrests of the couch structure such that the mesh sheeting is held in a fixed position relative to the couch structure;

wherein the plurality of stanchion structures comprises a left stanchion structure and a right stanchion structure;

wherein the left stanchion structure is a rigid structure;

wherein the left stanchion structure is a load bearing structure;

wherein the mesh sheeting permanently attaches to the left stanchion structure;

wherein the left stanchion structure secures the mesh sheeting into a fixed position along the anterior side of the couch structure;

wherein the left stanchion structure is bound to the couch structure at a position proximal to the left armrest;

wherein the right stanchion structure is a rigid structure;

wherein the right stanchion structure is a load bearing structure;

wherein the mesh sheeting permanently attaches to the right stanchion structure;

wherein the right stanchion structure secures the mesh sheeting into a fixed position along the anterior side of the couch structure;

wherein the right stanchion structure is bound to the couch structure at a position proximal to the right armrest.

9. The safety barrier system for use with furniture according to claim 8 wherein the plurality of binding straps comprises a first binding strap, a second binding strap, and a third binding strap;

wherein the first binding strap is a textile based webbing structure;

wherein the first binding strap is a flexible structure;

wherein the first binding strap is a load bearing structure;

wherein the first binding strap attaches to both the left armrest and the right armrest of the barrier structure;

wherein the first binding strap applies a tension to the left armrest and the right armrest that binds the barrier structure to the couch structure;

wherein the second binding strap is a textile based webbing structure;

wherein the second binding strap is a flexible structure;

wherein the second binding strap is a load bearing structure;

wherein the second binding strap attaches to both the left armrest and the right armrest of the barrier structure;

wherein the second binding strap applies a tension to the left armrest and the right armrest that binds the barrier structure to the couch structure;

wherein the third binding strap is a textile based webbing structure;

wherein the third binding strap is a flexible structure;

wherein the third binding strap is a load bearing structure;

wherein the third binding strap attaches to both the left armrest and the right armrest of the barrier structure;

wherein the third binding strap applies a tension to the left armrest and the right armrest that binds the barrier structure to the couch structure.

10. The safety barrier system for use with furniture according to claim 9 wherein the plurality of fastening devices comprises a first hook and loop fastener, a second hook and loop fastener, a third hook and loop fastener, a fourth hook and loop fastener, a fifth hook and loop fastener, and a sixth hook and loop fastener;

wherein the first hook and loop fastener is the hook and loop faster that secures the first binding strap to the left armrest;

wherein the second hook and loop fastener is the hook and loop faster that secures the first binding strap to the right armrest;

wherein the third hook and loop fastener is the hook and loop faster that secures the second binding strap to the left armrest;

wherein the fourth hook and loop fastener is the hook and loop faster that secures the second binding strap to the right armrest;

wherein the fifth hook and loop fastener is the hook and loop faster that secures the third binding strap to the left armrest;

wherein the sixth hook and loop fastener is the hook and loop faster that secures the third binding strap to the right armrest.

* * * * *